US008148791B1

(12) United States Patent
Holaway

(10) Patent No.: US 8,148,791 B1
(45) Date of Patent: Apr. 3, 2012

(54) HEAD GIMBAL ASSEMBLY APPARATUS HAVING AN ACTUATOR MOUNTED ON A MOUNTING PLATE COMPRISING A CERAMIC SUB-PLATE FORMED ON A STAINLESS STEEL MOUNTING PLATE

(75) Inventor: Brett Holaway, Temecula, CA (US)

(73) Assignee: Magnecomp Corporation, Murrieta, CA (US)

( * ) Notice: Subject to any disclaimer, the term of this patent is extended or adjusted under 35 U.S.C. 154(b) by 115 days.

(21) Appl. No.: 12/539,298

(22) Filed: Aug. 11, 2009

Related U.S. Application Data

(60) Provisional application No. 61/092,017, filed on Aug. 26, 2008.

(51) Int. Cl.
*H01L 29/84* (2006.01)
*G11B 5/48* (2006.01)

(52) U.S. Cl. ....... 257/415; 360/77.16; 360/81; 360/104; 360/244.6; 257/E27.006

(58) Field of Classification Search ........... 257/415, 257/417; 73/570, 760; 31/77.03, 78.11; 360/78.05, 77.16, 81, 104, 244.6
See application file for complete search history.

(56) References Cited

U.S. PATENT DOCUMENTS

| | | | | |
|---|---|---|---|---|
| 6,023,963 A | * | 2/2000 | Schaenzer et al. | 73/105 |
| 6,138,502 A | * | 10/2000 | Burga et al. | 73/105 |
| 6,618,220 B2 | * | 9/2003 | Inagaki et al. | 360/78.05 |
| 7,034,372 B1 | | 4/2006 | Kulangara et al. | |
| 2009/0268326 A1 | * | 10/2009 | Shelor | 360/31 |

* cited by examiner

*Primary Examiner* — Anh Mai
(74) *Attorney, Agent, or Firm* — Intellectual Property Law Offices of Joel Voelzke, APC

(57) ABSTRACT

A test assembly for a disk drive suspension head gimbal assembly includes a steel mount plate and a mount sub-plate of a material such as silicon carbide having a modulus of elasticity to density ratio that is significantly higher than the ratio for stainless steel. Preferably the mount plate and the mount sub-plate taken together have a first resonant shear frequency of greater than 50 KHz, which is generally greater than the frequency range of interest for testing head gimbal assemblies. The high modulus of elasticity to density ratio helps to ensure that any shear mode resonances of the test assembly occur at frequencies that are higher than the frequencies of interesting for head gimbal assembly shear resonance testing purposes.

20 Claims, 6 Drawing Sheets

HEAD GIMBAL ASSEMBLY APPARATUS HAVING AN ACTUATOR MOUNTED ON A MOUNTING PLATE COMPRISING A CERAMIC SUB-PLATE FORMED ON A STAINLESS STEEL MOUNTING PLATE

CROSS-REFERENCE TO RELATED APPLICATIONS

This application claims the benefit of U.S. Provisional Patent Application Ser. No. 61/092,017 filed Aug. 26, 2008.

BACKGROUND OF THE INVENTION

1. Field of the Invention

This invention relates to the field of a test apparatus for head gimbal assemblies for hard disk drives. More particularly, this invention relates to the field a head gimbal assembly test shaker for resonance testing of head gimbal assemblies, having improved system mode performance.

2. Description of Related Art

Magnetic hard disk drives used for data storage typically included a head gimbal assembly (HGA) which carries a slider which includes a read/write transducer for writing data to, and reading data from, the disk surface. As recording track densities increase and servo bandwidths also increase, there is a need to test HGA resonance and other dynamic characteristics at high frequencies. U.S. Pat. No. 7,034,372, assigned to the assignee of the present application and hereby incorporated in its entirety, discloses a HGA dynamics tester which uses a piezoelectric device to drive the HGA for resonance testing. FIGS. 1 and 2 herein illustrate such a prior art dynamic tester. Test assembly 10 comprises a mounting plate 12, a piezoelectric (PZT) crystal actuator 14, and a load plate 16. Mounting plate 12 and load plate 16 are typically made of 440 C stainless steel. Epoxy (not shown) is used to adhere the parts together.

The shaker is mounted to the test assembly holder via an electromagnet. This requires a ferrous material on the bottom surface of the mounting plate 12. The 440 C material is sufficiently ferromagnetic for this purpose. Different mounting methods are possible, and may require a high wear surface such as a tooling steel for low cost and high life.

During test, PZT 14 is driven horizontally, i.e., in shear, in either the x or y direction. Typically, the resonance behavior of HGA 18, which is the unit under test (UUT), is tested by sensing the position and velocity of various parts of the HGA using a laser Dopper vibrometer (LDV) and correlating the output movement to the input movement, in order to calculate the frequency response of the UUT. As areal density increases the disk drive data track sizes shrink, the resonance performance of the HGA becomes more critical, and accurately measuring the resonance performance of the HGA likewise becomes more critical.

SUMMARY OF THE INVENTION

The present invention provides a HGA dynamic tester which exhibits fewer resonance modes within frequencies of interest for HGA testing, and hence allows for more accurate resonance testing of HGAs and extends the usable test frequency range.

It was previously assumed that mounting plate 12 acts like a rigid body. It has been discovered that that is not the case. More specifically, it has been discovered that prior HGA testers exhibit resonance modes within the frequencies of interest, that is, those frequencies to which the HGA will be subjected in operation and therefore for which the manufacturer wishes to have accurate resonance data. The frequency range of interest in HGA testing is approximately 1 KHz to 50 KHz and in the future frequency range may extend to 100 KHz.

FIG. 3A is a frequency response plot of the prior tester of FIG. 1 showing the amplitude of displacement, according to a simulation model and according to measurements obtained in the laboratory. The simulation plot shows three large peaks at approximately 24 KHz, 34 KHz, and 42 KHz. All of those peaks lie within the frequency range of interest of 1-50 KHz.

FIGS. 3B-3D are displacement plots for each of the resonant modes of the test shaker of FIG. 1. In these figures, the test shaker is shown in X, Y, and Z, along with a displacement of the modal shape as indicated by shading.

The tester resonances can distort the resulting resonance data for the HGA. Accordingly, there is a need for HGA testers with improved resonance performance, and particularly, with improved mode performance.

Materials with a higher modulus to density ratio than 440 C stainless steel will increase the natural frequencies of the system modes, allowing for a higher usable frequency window. Ideally the mount would be made of a material having a high ratio of modulus of elasticity, also known as the Young's modulus, to density. Taking into account practical considerations, the mount can be constructed of one or more materials to balance the needs of mounting to the test machine and performance. For example, the mount can be made of a combination of a first material comprising 440 C stainless steel, and a second material having a high ratio of modulus of elasticity to density which is disposed between the mount and the PZT. Additionally, different configurations of plates may be used.

Since 440 C is a low dampening material, modes that do exist show a higher amplitude compared to using a plate material with a higher internal dampening ratio.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
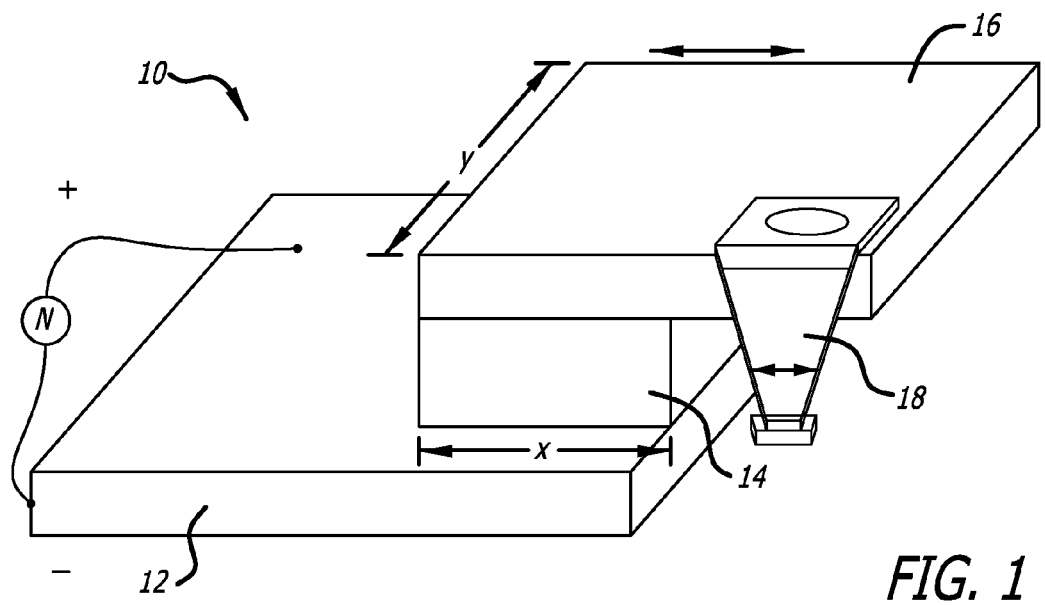
FIG. 1 is an oblique view of a prior art HGA resonance tester.
Figure 2:
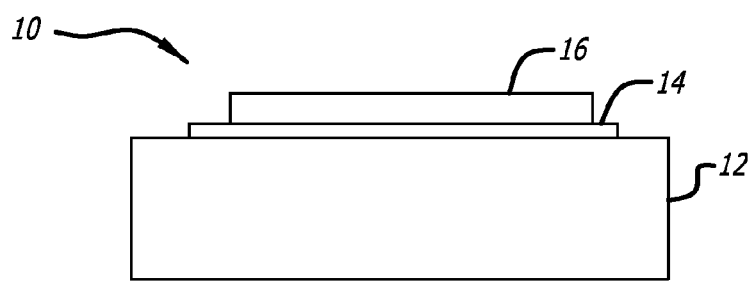
FIG. 2 is a side elevation view of the HGA tester of FIG. 1.
Figure 3A:
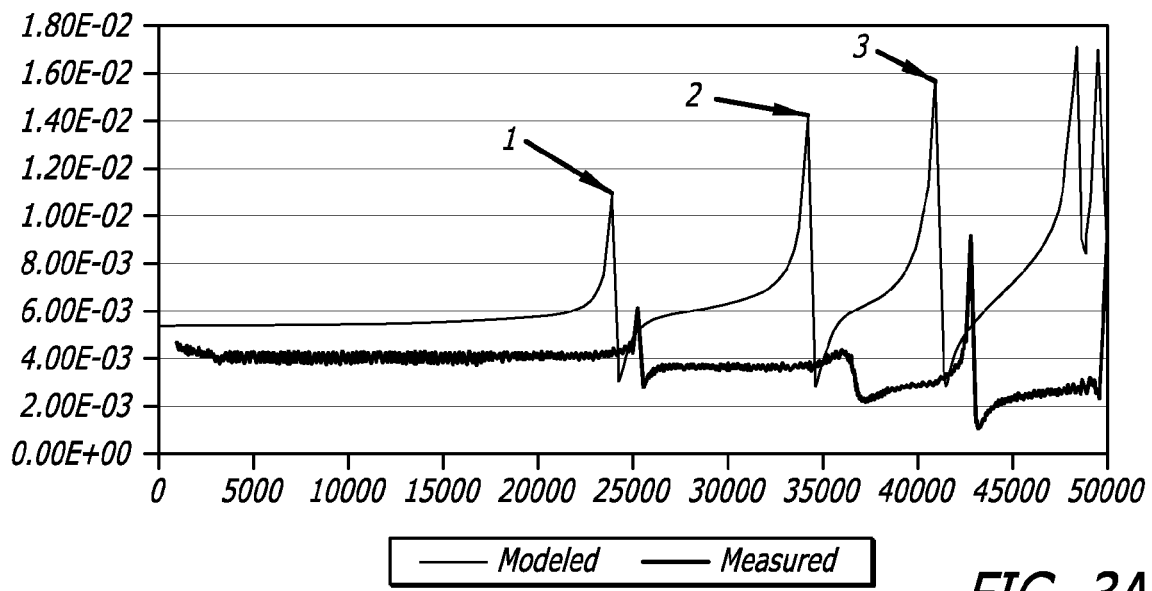
FIG. 3A is a frequency response plot of the prior tester of FIG. 1 in response to shear vibration, according to a simulation model and according to measurements obtained in the laboratory.
Figure 3B:
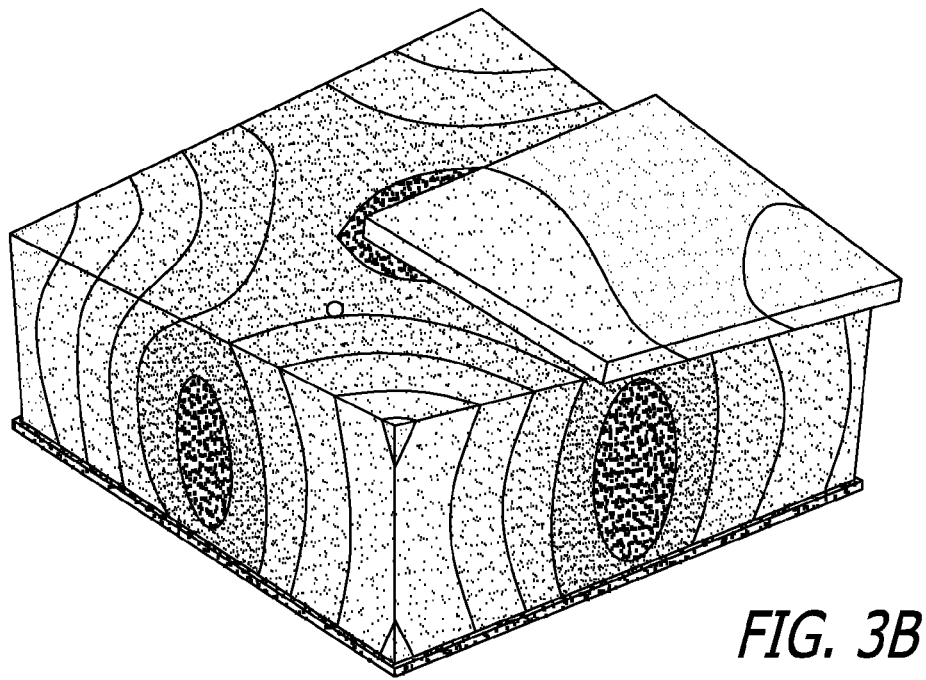
FIGS. 3B-3D are displacement plots for each of the nodes for the resonant modes of the test shaker of FIG. 1.
Figure 3C:
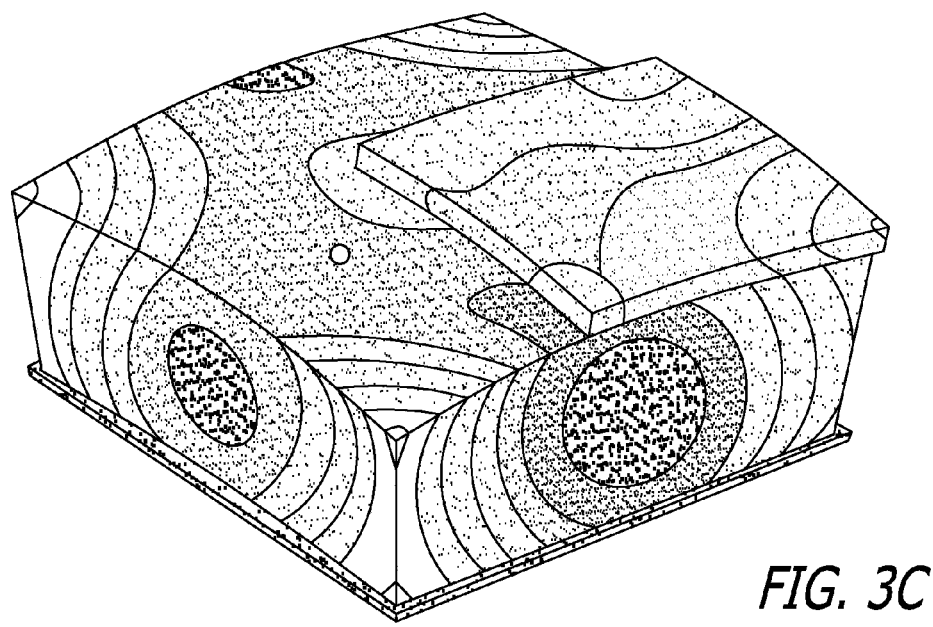
Figure 3D:
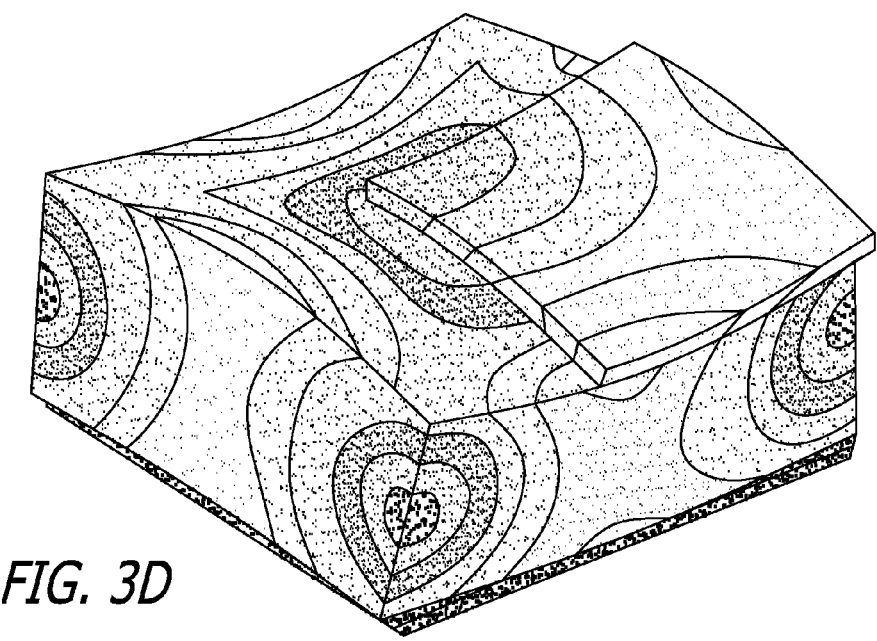
Figure 4:
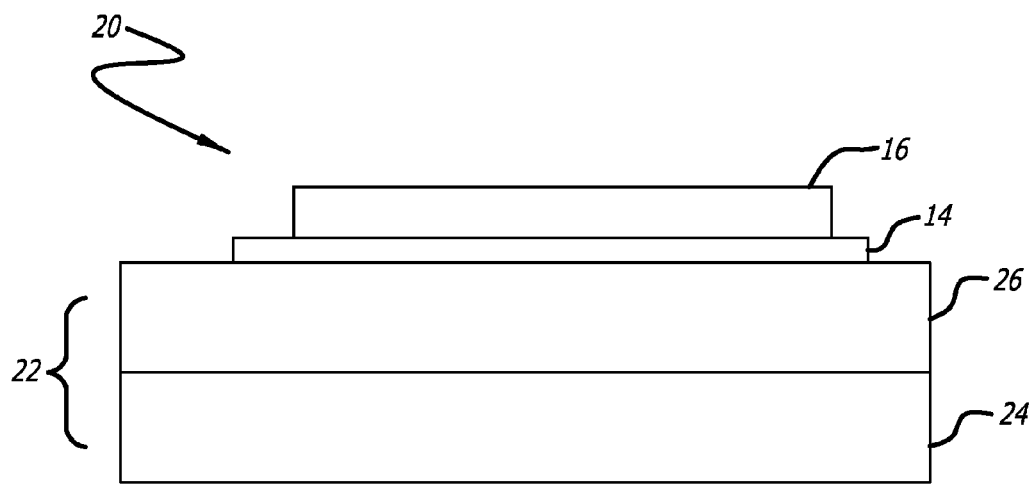
FIG. 4 is a side elevation view of a HGA resonance tester according to a first embodiment of the present invention.

FIG. 4 is a side elevation view of a HGA resonance tester according to a first embodiment of the present invention. Test assembly 20 includes a mount 22, the mount comprised of a first mount piece that is mounting plate 24, and a second mount piece that is a sub-plate 26, the first and second mount pieces being made of two different materials. The key is that one of the materials has a high modulus to density ratio. Sub-plate 26 has a high stiffness which significantly increases the natural resonant frequency of the entire system.

Figure 5:
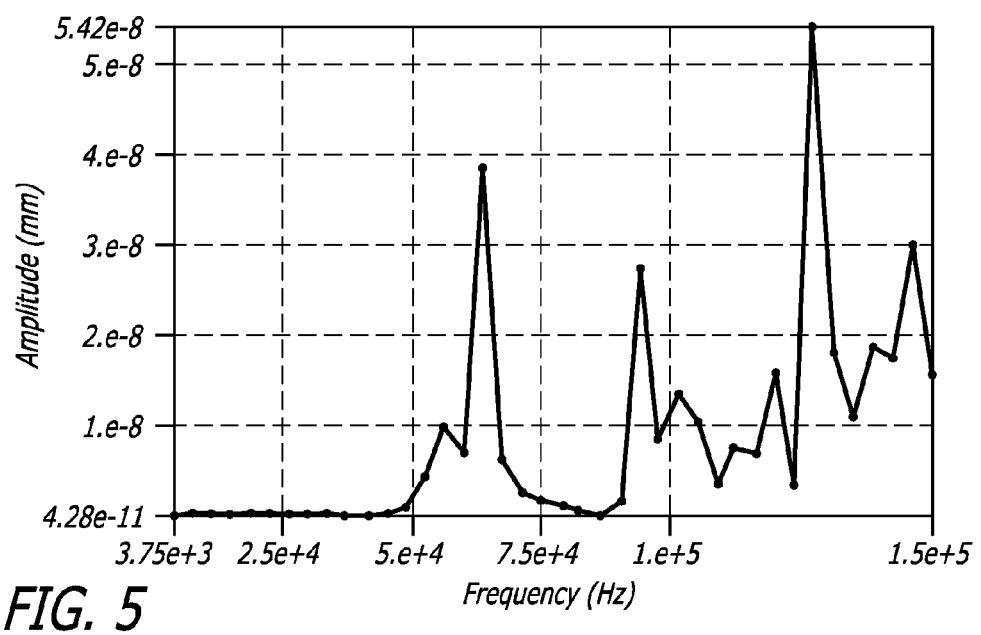
FIG. 5 is a frequency response plot of the tester of FIG. 4 in shear.

FIG. 5 shows the modeled system response in shear for the embodiment of FIG. 4. It shows that the first resonance mode is greater than 50,000 Hertz. This demonstrates that the shaker baseline can be such that there are no modes between 1000 and 50,000 Hertz, which is the entire test range for HGA/suspension resonance testing. In this simulation the 440 C stainless steel mounting plate 24 and the SiC sub-plate 26 were equal in thickness.

Figure 6:
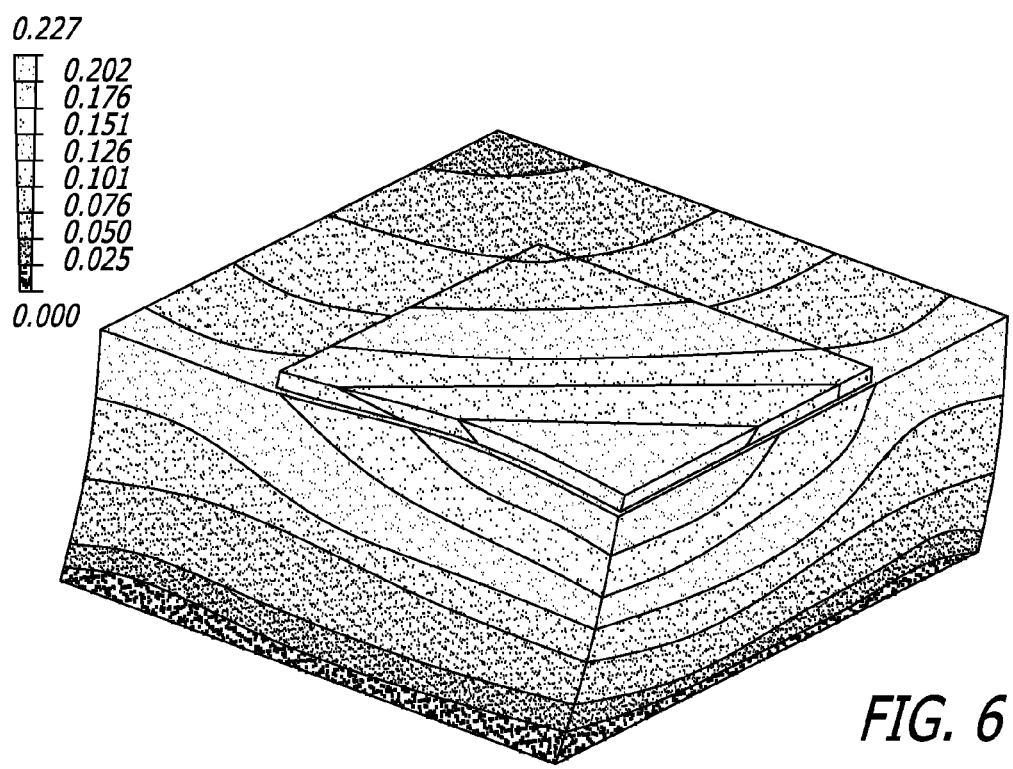
FIGS. 6-8 are displacement plots for each of the resonant modes of the test shaker of FIG. 4.
Figure 7:
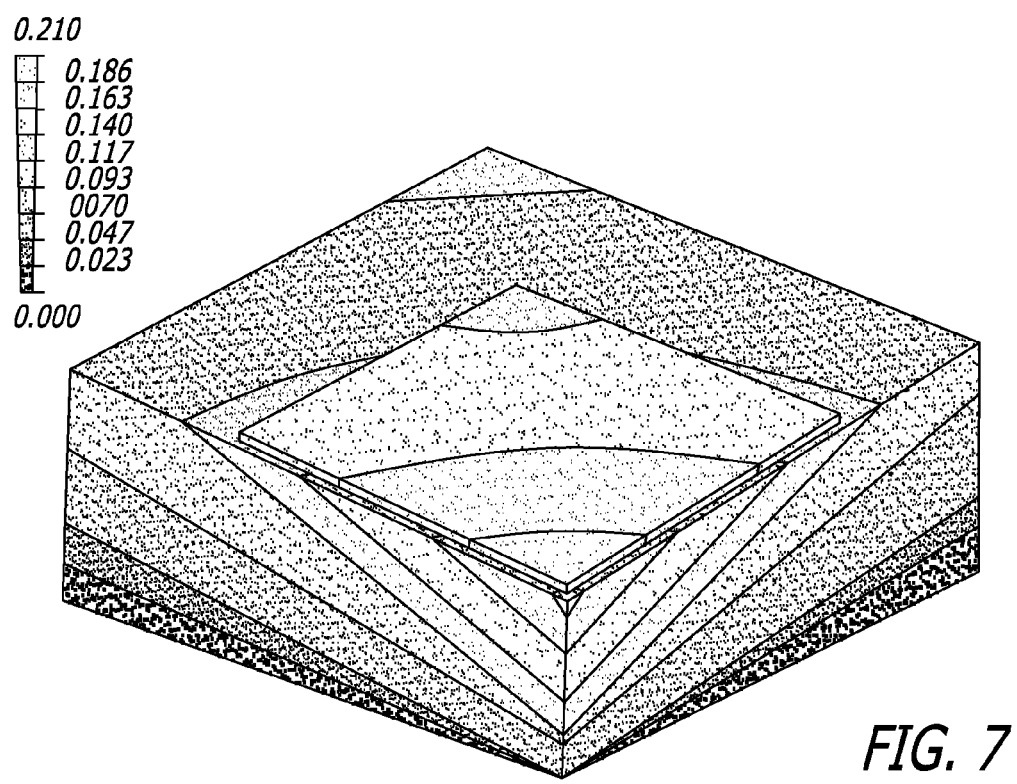
Figure 8:
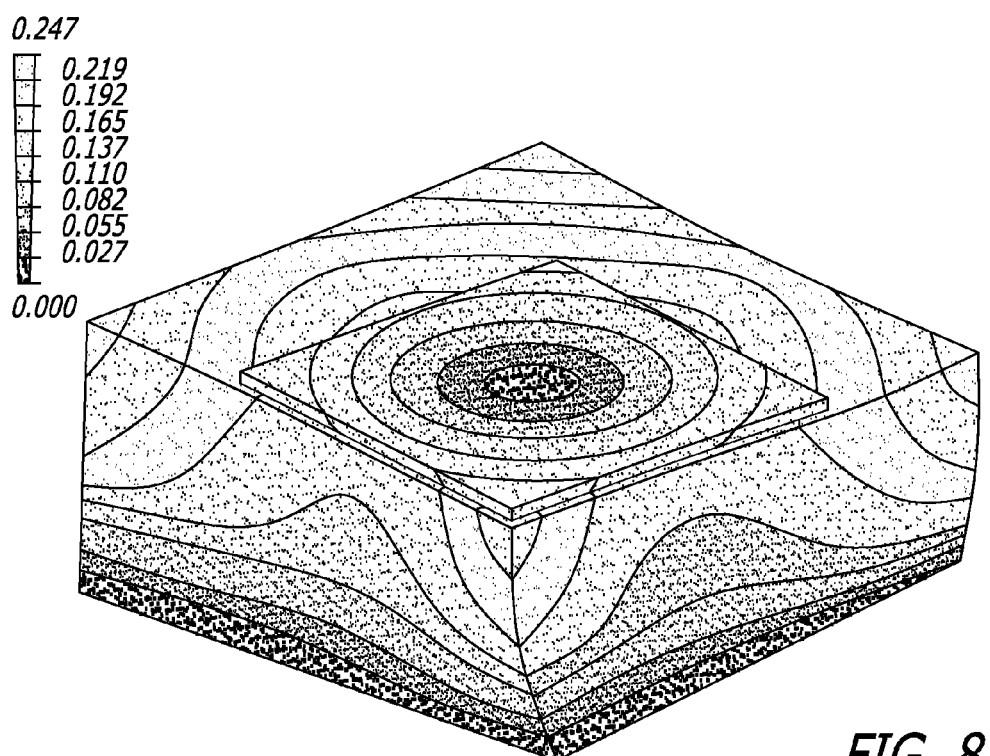

FIGS. 6-8 are displacement plots for each of the resonant modes shown in the plot of FIG. 5, according to a finite element analysis model simulation. In FIGS. 6-8, the part is shown in X, Y, and Z, along with a final shape of the modal shape along with a displacement of the modal shape as indicated by shading. The figures show the dynamic displacement amplitudes, represented as various degrees of shading, from the static shape, as well as the average deformed shape in X, Y, and Z. Each of the three figures shows the motion of the part at a single frequency.

FIG. 6 shows motion of the part of the tester of FIG. 4 at the first resonant frequency of 54 KHz.

FIG. 7 shows motion of the part of the tester of FIG. 4 at the first resonant frequency of 55 KHz.

FIG. 8 shows motion of the part of the tester of FIG. 4 at the first resonant frequency of 64 KHz.

440 C stainless steel is a very hard, high carbon martensitic steel. 440 C stainless steel and SiC have the following mechanical properties:

| Material | Modulus of Elasticity (GPa) | Density (Kg/m$^3$) |
| --- | --- | --- |
| 440 C Stainless Steel | 200 | 7650 |
| Silicon Carbide (SiC) | 410 | 3100 |

440 C stainless steel thus has modulus-to-density ratio of $26 \times 10^3$ Nm/g, and SiC has a modulus-to-density ratio of $131 \times 10^3$ Nm/g, with the ratio for SiC being about 5.1 times the ratio for 440 C. Preferably the modulus-to-density ratio of the material for sub-plate 26 is greater than 1.5 times the modulus-to-density ratio of 440 C stainless steel (i.e., greater than $39 \times 10^3$ Nm/g) and more greater than 3 times the modulus-to-density ratio of 440 C stainless steel (i.e., greater than $78 \times 10^3$ Nm/g) and more preferably still greater than 4 times the modulus-to-density ratio of 440 C stainless steel (i.e., greater than $105 \times 10^3$ Nm/g).

Figure 9:
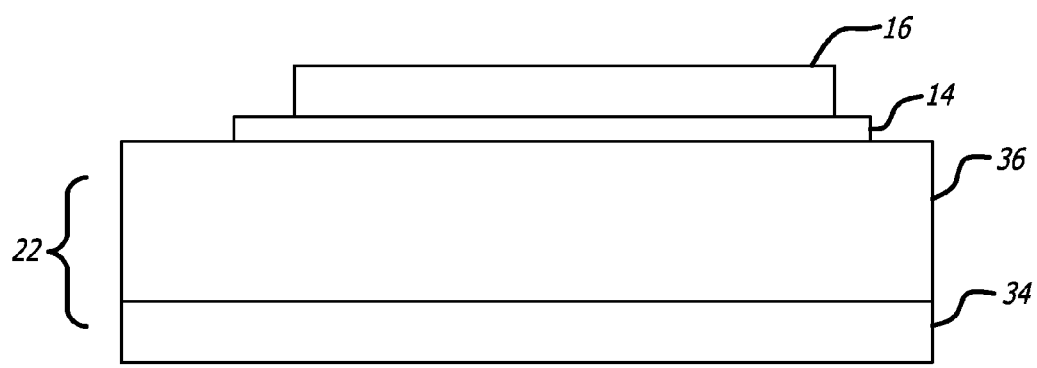
FIG. 9 is a side elevation view of a HGA resonance tester according to a second embodiment of the present invention.

Increasing the thickness of the SiC plate and reducing the thickness of the 440 C plate will increase the frequency of all resonant modes as well. FIG. 9 shows a second embodiment of the invention in which the sub-plate 36, made of the high modulus to density ratio material, is significantly thicker than mounting plate 34, which is made of the 440 C material. Optimally sub-plate 36 takes up most of the thickness of mount 22, with mounting plate 34 being only thick enough to provide a ferromagnetic mass and surface to be held sufficiently securely by the electromagnetic test assembly holder.

In a third embodiment (not shown) the mount plate 26 is eliminated altogether, and the entire mount 22 is made of SiC or other suitable material having a high modulus-to-density ratio. In such an embodiment, the test assembly would need to be held in place by some method other than ferromagnetism, such as via clamping, bolting, or other methods.

Although sub-plates 26 and 36 are disclosed as being SiC in the exemplary embodiments herein, it will be appreciated that other materials having a high modulus of elasticity to density ratio can be used. Such materials would include without limitation silicon carbide, boron carbide, ceramic, composites, plastics, and reinforced carbon.

As previously stated, the frequency range of interest in HGA testing is approximately 1 KHz to 50 KHz. That frequency range necessarily encompasses the frequencies of 5 KHz, 10 KHz, 20 KHz, 30 KHz, 40 KHz, and 50 KHz. The test apparatus is therefore adapted for testing the UUT at all of those frequencies.

In the illustrative embodiments shown, the tester including the plate, the subplate, and the load plate are shown as being rectangular. Of course, the tester assembly including its constituent parts can be any of a number of shapes including square, rectangular, round, elliptical, irregular, asymmetric, etc.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A head gimbal assembly shaker test apparatus comprising:
 a mounting plate;
 a sub-plate disposed on the mounting plate; and
 an actuator disposed on the sub-plate;
 wherein the sub-plate has a modulus of elasticity to density ratio that is higher than that of the mounting plate.

2. The apparatus of claim 1 wherein the sub-plate comprises silicon carbide and is thicker than the mounting plate.

3. The apparatus of claim 1 wherein the sub-plate comprises a material that has a ratio of modulus of elasticity to density that is at least 1.5 as high as that of 440 C stainless steel.

4. The apparatus of claim 1 wherein the sub-plate comprises a material that has a ratio of modulus of elasticity to density that is at least 4 times as high as that of 440 C stainless steel.

5. The apparatus of claim 3 wherein the sub-plate material is selected from the group consisting of silicon carbide, boron carbide, ceramic, composite, plastic, carbon fiber, and reinforced carbon.

6. The apparatus of claim 3 wherein the sub-plate consists essentially of silicon carbide.

7. The apparatus of claim 1 wherein the mounting plate comprises stainless steel.

8. The apparatus of claim 1 further comprising a load plate affixed to the actuator.

9. The apparatus of claim 8 wherein the load plate comprises metal.

10. The apparatus of claim 1 wherein the test apparatus has no shear mode resonant frequencies of less than 50 KHz.

11. A head gimbal assembly shaker test apparatus for testing shear mode resonance performance of a head gimbal assembly, the test apparatus comprising:
  a mount comprising a material that has a ratio of modulus of elasticity to density that is at least 1.5 times as high as that of 440 C stainless steel;
  an actuator affixed on top of the mount for shaking a head gimbal assembly at a frequency of at least 10 KHz; and
  a load plate affixed on top of the actuator, the load plate being adapted for holding a head gimbal assembly to be tested.

12. The apparatus of claim 11 wherein the mount comprises silicon carbide.

13. The apparatus of claim 11 wherein the mount comprises a material that has a ratio of modulus of elasticity to density that is at least $78 \times 10^3$ Nm/g.

14. The apparatus of claim 11 wherein the mount has no shear mode resonant frequencies of less than 50 KHz.

15. The apparatus of claim 11 wherein the mount comprises a mounting plate and a sub-plate, the sub-plate being disposed on the mounting plate and being thicker than the mounting plate and of a different material than the mounting plate.

16. The apparatus of claim 15 wherein the mount sub-plate material has a ratio of modulus of elasticity to density of greater than $105 \times 10^3$ Nm/g.

17. The apparatus of claim 1 further comprising a head gimbal affixed on the load plate, the head gimbal defining a unit under test.

18. The apparatus of claim 17 wherein:
  the mounting plate comprises a generally planar plate of steel;
  the sub-plate is mounted directly on top of the steel mounting plate;
  the sub-plate comprises a generally planar plate of material selected from the group consisting of silicon carbide, boron carbide, ceramic, composite, plastic, carbon fiber, and reinforced carbon; and
  the actuator is mounted directly on top of the sub-plate.

19. The apparatus of claim 18 wherein the apparatus has no shear mode resonances of less than 50 kHz.

20. The apparatus of claim 18 wherein the sub-plate is thicker than the mounting plate.

\* \* \* \* \*